(12) United States Patent
Hardesty

(10) Patent No.: US 12,275,214 B1
(45) Date of Patent: Apr. 15, 2025

(54) MULTI-LAYER METAL INSULATION TO SHUNT THERMAL TRANSFER FROM EXTERNAL ENVIRONMENTS ABOVE 1200° C

(71) Applicant: Peregrine Falcon Corporation, Pleasanton, CA (US)

(72) Inventor: Robert E. Hardesty, Orinda, CA (US)

(73) Assignee: Peregrine Falcon Corporation, Pleasanton, CA (US)

( * ) Notice: Subject to any disclaimer, the term of this patent is extended or adjusted under 35 U.S.C. 154(b) by 69 days.

(21) Appl. No.: 18/231,761

(22) Filed: Aug. 8, 2023

Related U.S. Application Data

(60) Provisional application No. 63/396,178, filed on Aug. 8, 2022.

(51) Int. Cl.
*B32B 3/12* (2006.01)
*B32B 15/01* (2006.01)
*B64C 1/40* (2006.01)

(52) U.S. Cl.
CPC ............... *B32B 15/01* (2013.01); *B32B 3/12* (2013.01); *B64C 1/40* (2013.01); *B32B 2307/304* (2013.01); *B32B 2605/18* (2013.01)

(58) Field of Classification Search
None
See application file for complete search history.

(56) References Cited

U.S. PATENT DOCUMENTS

| | | | |
|---|---|---|---|
| 4,094,717 A | 6/1978 | Barr | |
| 4,344,591 A | 8/1982 | Jackson | |
| 4,919,366 A | 4/1990 | Cormier | |
| 5,460,864 A * | 10/1995 | Heitkamp | B32B 3/12 428/116 |
| 5,474,262 A | 12/1995 | Fiore | |
| 6,689,470 B1 | 2/2004 | Joseph | |
| 6,846,574 B2 | 1/2005 | Subramanian | |
| 7,001,656 B2 | 2/2006 | Maignan et al. | |
| 9,731,471 B2 | 8/2017 | Schaedler et al. | |
| 2009/0175006 A1 | 7/2009 | Jou et al. | |
| 2020/0247083 A1* | 8/2020 | Ros | E04B 2/36 |

* cited by examiner

*Primary Examiner* — Daniel J. Schleis
(74) *Attorney, Agent, or Firm* — Mark Protsik; Thomas Schneck

(57) ABSTRACT

An integrated multi-layer metal insulation structure thermally isolates an interior system from external environments more than 1200° C. Three or more refractory metal sheet layers are separated from one another by respective standoffs, where refractory metal comprises any elemental or alloy metal with a melting point more than 1600° C. Each standoff is in the form of a skeletal cage framework of refractory metal ribs with cells between the ribs. Successive interlayers are offset from one another to shunt the heat transfer laterally at each sheet layer. The ribs may have cutouts and the cells may be partially open. Each crate standoff limits thermal transfer from one sheet layer to the next to less than 2.5 W/mK, including the cells restricting air flow to substantially eliminate convective heat transfer and the skeletal cage framework creating a tortuous thermal path that lowers conductive heat transfer to less than 5% of environmental exposure.

Conductive transfer can be lowest for the innermost interlayer forming a thermal gate.

13 Claims, 4 Drawing Sheets

MULTI-LAYER METAL INSULATION TO SHUNT THERMAL TRANSFER FROM EXTERNAL ENVIRONMENTS ABOVE 1200° C

CROSS-REFERENCE TO RELATED APPLICATION

The present application claims priority under 35 U.S.C. 119 (e) from prior U.S. provisional application 63/396,178, filed Aug. 8, 2022.

FEDERALLY SPONSORED RESEARCH OR DEVELOPMENT

This invention was made with government support under contract HQ0147-17-C-7409 awarded by the U. S. Department of Defense, Missile Defense Agency. The government has certain rights in the invention.

TECHNICAL FIELD

The invention relates to multi-layer metal insulation (MLMI) serving as thermal protection systems (TPS) in extreme thermal environments to isolate interior protected systems from an extreme external environment, and particularly those with integrated structures that can handle thermomechanical stresses at temperatures above 1200° C. The integrated structures may be in the form of a sandwich panel, or sandwich-structured composite with a core providing a thermally resistive path between outer and inner layers of the sandwich.

BACKGROUND ART

With the advent of hypersonic flight vehicles, as well as other high temperature systems such as solar concentrators and upcoming fusion energy reactors, advanced thermal protection systems (TPS) are needed. Extreme thermal environments above 1200° C. are typical and can at times exceed 2000° C. These temperatures require a TPS with very low thermal conductivity, usually under 2.5 W/mK, to effectively isolate protected systems within a TPS from the severe environment and thereby prevent the external temperatures from adversely affecting critical internal systems.

Additionally, many TPS applications such as aeroshells for hypersonic flight vehicles have both low mass and structural requirements to extend their reach while also supporting high shear and tensile loads during flight. Developing exterior-to-interior temperature gradients in typical hypersonic flight profiles can lead to differential thermal expansion of outer parts of a TPS structure that produce thermomechanical stresses which need to be endured. The TPS materials and structures must be sufficiently robust and stable to enable the systems they support to reliably fulfill their mission. Meeting both the thermal insulating and the structural requirements is challenging.

The simplest systems are coating layers over a surface to form a thermal barrier. For example, U.S. Pat. No. 6,689,470 to Joseph describes a carbon foam coating that forms a carbonaceous protective layer on a panel to provide insulation. U.S. Pat. No. 6,846,574 to Subramanian describes a thermal barrier coating with a honeycomb structure, where cell volumes contain an insulating filler material of ceramic spheres bonded to one another. Such coatings are generally suitable only for the more benign lower temperature environments.

Slightly more complex TPS provide a single sandwich of thermal protective material between inner and outer panels. In U.S. Pat. No. 4,344,591 to Jackson, the intermediate thermal protective core material can be in the form of a stack of dimpled foil titanium sheets, a felt of fibrous zirconia threads, or a silicide-coated niobium waffle. U.S. Pat. No. 5,474,262 to Fiore has a honeycomb core member between inner and outer panels to form a multiple walled structure that can be integrated more easily into a structural component of a spacecraft. These single sandwich structures are suitable for only the lower temperature range that is needed (e.g., Jackson provides thermal protection up to 1371° C.). U.S. Pat. No. 7,001,656 to Maignan et al. describes a rigid multilayer structure that seeks to insulate by stacking a series of honeycomb plates sandwiched between skins in successive layers. Here the core honeycomb material of each sandwich layer is made of polyetherimide or aramid polymer (such as NOMEX®), which does not carry structural loads and thus relies upon the skin panels for support.

SUMMARY DISCLOSURE

An integrated multi-layer metal insulation (MLMI) structure is provided for thermally isolating an interior system from external environments more than 1200° C. In this MLMI structure, three or more refractory metal sheet layers are separated from one another by respective crate standoffs. Here, refractory metal is defined to comprise any elemental or alloy metal with a melting point more than 1600° C. Each crate standoff is in the form of a skeletal cage framework of refractory metal cells with pockets within the cells. The cells of the skeletal cage framework may be partially open cells. Each crate standoff limits thermal transfer from one sheet layer to the next to less than 2.5 W/mK, and preferably less than 1 W/mK. This includes the cells restricting any internal air flow to substantially eliminate convective heat transfer. The skeletal cage framework provides load carrying, while also creating a tortuous throughput thermal path that lowers conductive heat transfer to less than 5% of environmental exposure. The thermal conduction pathways continue to be tortuous through successive metal sheet layers and skeletal cage framework interlayers, as the successive interlayers are offset from one another to shunt the heat transfer laterally at each sheet layer.

DETAILED DESCRIPTION

Figure 1:
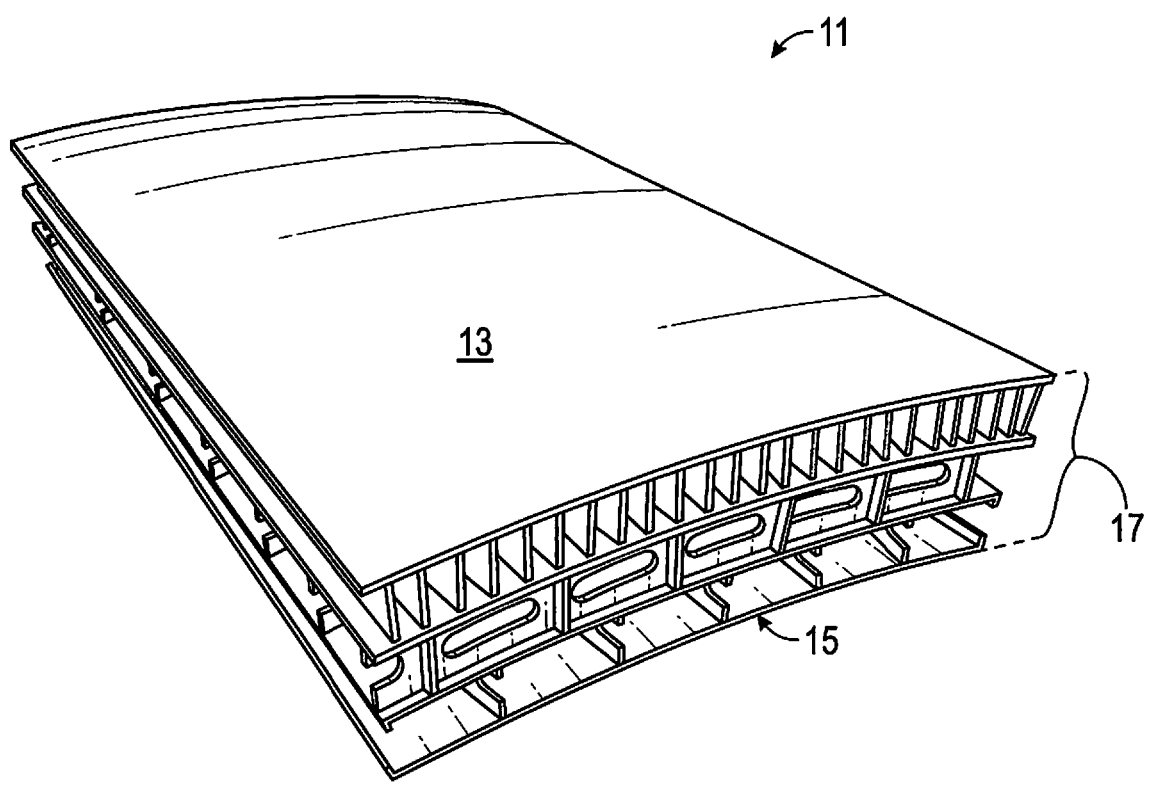
FIG. 1 is a perspective view of a fabricated monolithic MLMI frustum pane made in accordance with the present invention.

With reference to FIG. 1, a multi-layer metal insulation (MLMI) 11 is provided for thermally isolating an interior system from external environments with extreme high temperatures in excess of 1200° C., and often in excess of 2000° C. This MLMI 11 that serves as a thermal protection system (TPS) is designed to be an integrated structure that can provide primary load carrying ability while handling the thermomechanical stresses associated with the extreme temperature differentials developed between an outer layer 13 that is exposed to the high temperature environment and the MLMI's interior surface 15. Between the outer layer 13 and interior surface 15 is a multilayer formation of additional layers and low thermal transfer standoffs 17.

The MLMI structure 11 is composed of one or more refractory metal layers and standoffs. The term "refractory metal" has several different possible meanings in the art. In a narrow sense, it could be limited solely to the elements and alloys of niobium, molybdenum, tantalum, tungsten, and rhenium. These all have melting points greater than 2400° C. and are suitable materials for use in the MLMI structure 11, at least from a temperature standpoint. However, other transition metal elements and their alloys also have relatively high melting points and can be considered as refractory metals in a broader sense. These include the elements and alloys of osmium, iridium, ruthenium, rhodium, hafnium, zirconium, chromium, vanadium, and titanium. These all have melting points greater than 1600° C. and are considered suitable for at least the inner layers of the MLMI structure 11. Thus, for the purposes of this invention, the term "refractory metal" is defined to comprise any elemental or alloy metal with a melting point more than 1600° C. Preferred materials are tungsten, niobium, hafnium, and titanium alloys, but any of the other refractory metals are also possible. It is understood that a designer who makes use of the present invention will take material melting point and related mechanical properties at high temperature into account considering the extreme environmental conditions that are likely to be faced in any given application and will choose from available materials for each component part of the structure accordingly to achieve the desired thermal protection and robust mechanical stability of the structure 11.

Figure 2:
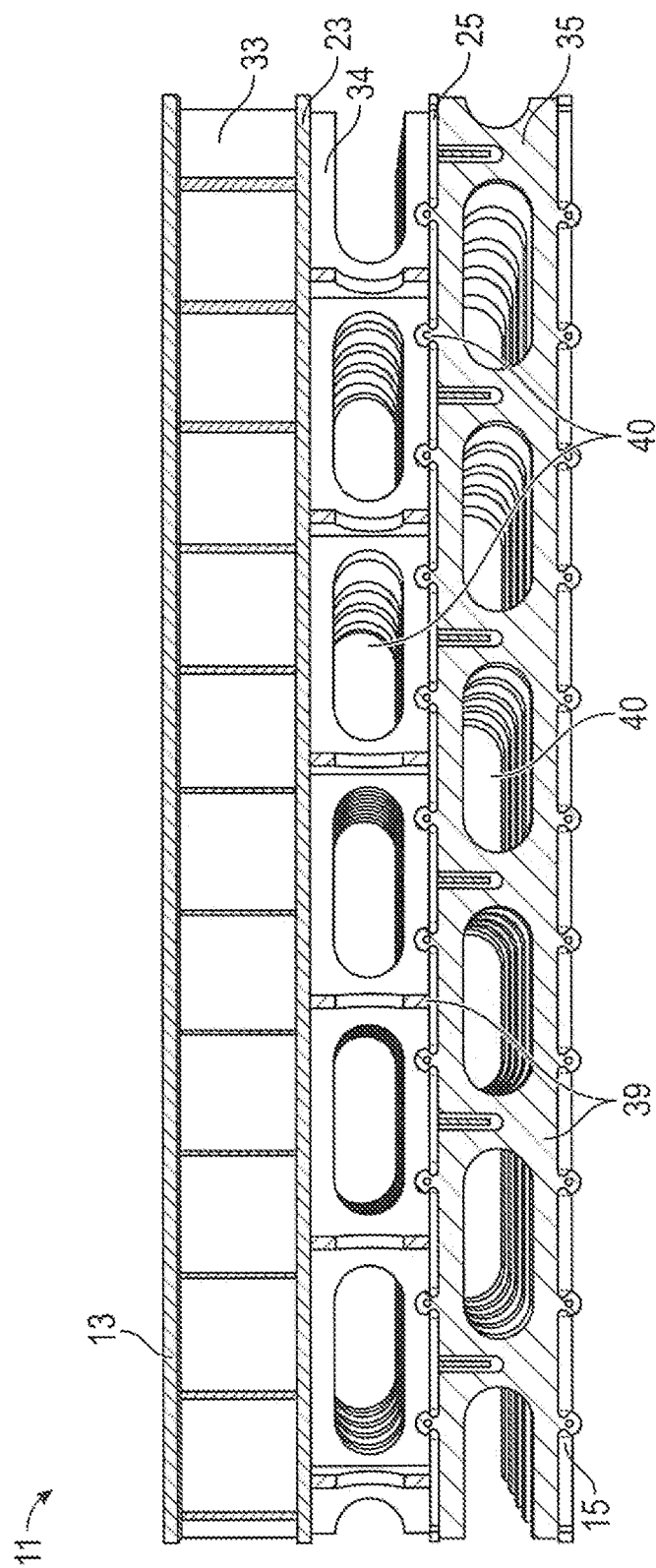
FIG. 2 is a side cross-section of an integrated multi-layer metal insulation (MLMI) thermal protection system (TPS) structure of the present invention.

With reference to FIG. 2, the MLMI structure 11 seen in cross-section has three or more refractory metal sheet layers 13, 23, 25, and 15 that are separated from one another by respective standoffs 33, 34 and 35 that are constructed to limit thermal transfer from one sheet layer to the next to less than 2.5 W/mk, and preferably less than 1 W/mK. Each standoff 33, 34, and 35 is in the form of a skeletal cage framework of refractory metal cells with pockets within the cells. For example, in one preferred implementation, the standoffs may comprise a first set of spaced apart, approximately parallel, vertical ribs 39, and a second set of spaced apart, approximately parallel, vertical ribs 39 that crisscross or intersect the first set to form a network of adjacent cells. The ribs 39 in one or both sets can have a series of oval cutouts 40 to form partially open cells. One might refer to the arrangement of cells as being somewhat similar to a "honeycomb", although the cells need not be hexagonal in shape or arrangement and, because of the presence of cutouts 40 in the ribs 39, may be partially open in the side walls connecting adjacent cells, unlike a true honeycomb. Likewise, one might describe the arrangement of cells as being somewhat similar to an "egg crate", although the cells are usually not ovoid in shape and again are partially open in the side walls connecting adjacent cells.

A primary purpose of the cells created by the skeletal cage framework of the standoffs 33, 34, and 35, is to restrict any internal air flow and thereby substantially eliminate convective heat transfer. The cutouts 40 in the ribs 39 reduce mass of the MLMI structure, but just as importantly create a tortuous throughput thermal path that lowers conductive heat transfer to less than 5% of environmental exposure. Usually, there will be some tradeoff between the amount of material cut out of the standoff ribs 39 and the resulting load carrying ability of the framework, which a designer will need to consider based upon expected conditions.

At a minimum, there will be three sheet layers sandwiching two interlayer standoff structures. But usually, there will be a sandwich of four sheet layers 13, 23, 25, and 15, and three interlayer standoff structures 33, 34, and 35, as shown in FIG. 2. There could be more than four sheet layers, if needed, at the cost of extra material mass. Typical sheet layer thicknesses are on the order of 0.5 mm or larger. To create a desired thermal gating effect, the next-to-innermost sheet layer may be much thinner, e.g., only 0.02 mm thick. The sheet layers need not all be composed of the same material. For example, in one possible embodiment the outer two layers may be composed of a niobium alloy (such as that known as C-103, which is nominally 89Nb-10Hf-1Ti), while the inner two layers may be composed of a titanium alloy (such as grade 38 (UNS R54250) titanium). Additionally, the outermost sheet layer, which is directly exposed to the high temperature external environment, can (optionally) be provided with a carbon or silicon carbide heat shell coating for additional protection.

The interlayer standoffs 33, 34, and 35 are preferably offset to create a staggered alignment between successive interlayers. This ensures a tortuous path to limit thermal transfer through the multiple layers of the sandwich structure. The interlayer standoffs need not be, and usually are not, identical from layer to layer. To minimize thermomechanical stresses resulting from differences in thermal expansion, the outermost interlayer standoffs will preferably allow a higher thermal transfer between sheet layers than the inner standoffs. The innermost standoff will then do much of the task of thermal isolation. This technique will be referred to as "thermal gating" and is regarded to be an important novel aspect of the present invention.

To create the different levels of thermal transfer, the height, spacing and cutout sizes in the standoff ribs may be varied. Changing the standoff height increases the distance between successive sheet layers for reduced radiant heat transfer (most important for the higher temperature outer layers) and increases the conduction path length as well for reduced conductive heat transfer. Typical spacings created by the standoffs between the sheet layers are on the order of 5 mm or more. Increasing the standoff cutout sizes, provided the cutouts are not so large that structural strength is not compromised, reduces the conduction pathways for lower conductive heat transfer. The standoff rib separation simultaneously affects both the conduction pathways and the cell size, which should not be increased so much that convective heat transfer becomes significant. The standoff rib separations and cutout sizes will typically result in from 1% to 5% in the percentage of interlocking skeletal structural material compared to the overall interlayer volume.

Figure 3:
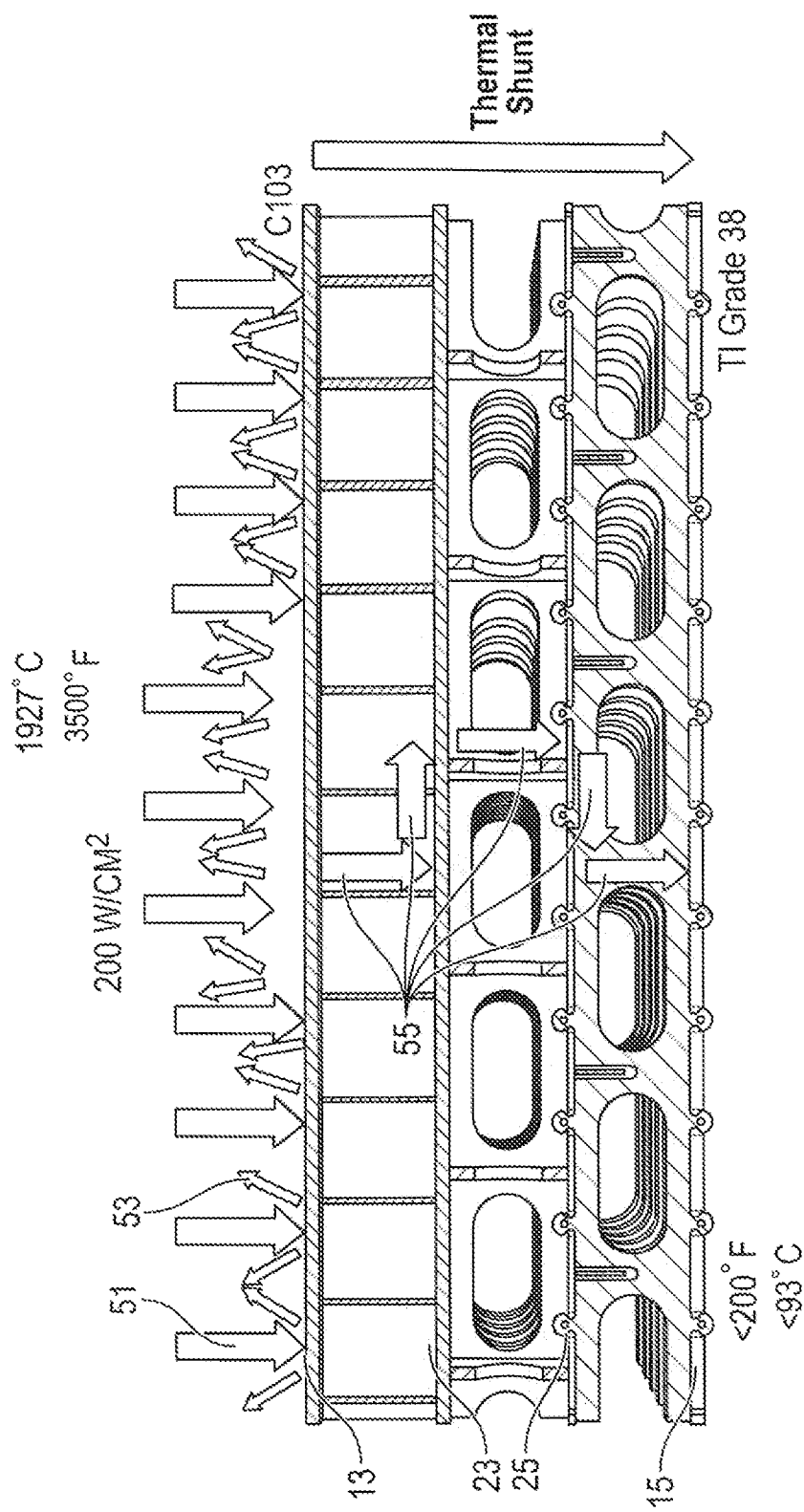
FIG. 3 is a side cross-section as in FIG. 2 illustrating thermal transfer characteristics of the MLMI structure.

With reference to FIG. 3, the different forms of thermal transfer (radiative, conductive, convective) and how they are handled by the interlayer standoffs are now discussed in greater detail. The outer metal sheet layer 13 is directly exposed to a high temperature environment, such as temperatures of 3500° F./1927° C./2200K. For example, aerodynamic heating to such temperatures can occur during hypersonic flight due to the friction between air and the high-speed object. Thermal energy 51 radiates upon the outer surface of sheet layer 13. (Note that for testing, this radiant heat can be simulated by directing a laser beam of about 200 W/cm$^2$ power density to impinge upon the surface of the sheet layer 13.) Some of the thermal energy 55 will gradually transfer inward toward the inner metal sheet layer 15, but when this thermal transfer is kept to less than 2.5 W/mk, and preferably less than 1 W/mK, most of the impinging thermal energy has nowhere to go but to be reflected 53 from the surface of sheet layer 13 back into the surrounding external environment, so that a temperature equilibrium is established (or nearly established) at the outer layer 13. The outer environment's temperature is the peak temperature of the outermost metal sheet layer 13 of the structure. The goal is to keep the temperature of the innermost metal sheet layer 15 (and thereby the interior systems disposed inside of that layer 15) below 200° F./93° C./366K, and preferably not more than 150° F./66° C./339K.

Convective heat transfer requires air movement in the volumes between the metal sheet layers. Because of the cellular structure created by the skeletal cage framework for the interlayer crate standoffs, air circulation is very minimal. Overall, the MLMI structure presents a sealed aeroshell that is closed by the sheet layers. Even with the cutouts in the rib standoffs and partially open cells within the cage framework, what remains of the ribs tends to obstruct air movement between cells, and the individual cell volumes can be selected to stifle intracellular circulation. Convective heat transfer is considered negligible.

Radiant heat transfer is proportional to differentials of temperatures raised to the fourth power, so that this can be the dominant transfer mechanism between the outermost two layers 13 and 23 but will substantially drop for transfers between the more inward successive layers from sheet layers 23 to 25 to 15.

$$Q = \varepsilon \sigma f (T_H^4 - T_C^4) A$$

where:
- $\varepsilon$=effective emissivity=0.043
  (C103 at 0.4 per surface and Ti at 0.30 per surface)
- f=view factor=1
- $\sigma$=Stefan Boltzmann constant=$5.67*10^{-8}$
- $T_H$=hot radiating surface temperature (e.g., 2200 K)
- $T_C$=colder surface (e.g., 339 K)
- A=area=1 $m^2$ Therefore,
for the outermost layers 13 and 23: Q=23.18 $W/cm^2$,
for the middle layers 23 and 25: Q=0.6552 $W/cm^2$,
for the innermost layers 25 and 15: Q=0.0689 $W/cm^2$.

Conductive heat transfer only occurs through the standoff ribs or through the entrapped intracellular air. The skeletal cage structure in the form of a network of crossing standoff ribs with cutouts minimizes the conductive thermal path between the sheet layers while simultaneously providing structural support. The skeletal cage provides both light weight and thermal isolation. The standoff ribs are typically only about 0.8 mm thick and about 12.5 mm tall to separate the sheet layers by 12.5 mm. (More generally, the standoff ribs provide a minimum 5 mm sheet separation.) The standoff rib separations and cutout sizes will typically result in from 1% to 5% in the percentage of interlocking skeletal structural material compared to the overall interlayer volume. Though each of the interlayers provides some degree of restriction in thermal conductivity, for adequate structural support stresses from differences in thermal expansion can be kept to a minimum by providing the greatest degree of conductive thermal isolation between the two innermost sheet layers. For example, the innermost skeletal cage interlayer may have only 1% or 2% of structural material of the overall total volume, the remaining 98% to 99% of the volume being open space taken up by the cells and standoff rib cutouts.

Fourier's conduction law: $Q = \Delta t * k * A / L$,

Where:
- Q=the thermal load in Watts (unknown)
- $\Delta t$=the temperature difference between members in ° C. is: 194° C.=260° C.-66° C. for the inner layers
- k=the thermal conductivity of the material, W/m° C. (~8 W/m C for titanium grade 38 and ~0.03 W/mK for air at ~100° C.) with 3.5% Ti present in the skeletal structure and 96.5% air in the cells, the effective thermal conductivity of a 1 $m^2$ area is =0.03*8 W/mK+ 0.965*0.03 W/mK=0.31 W/mK
- A=The cross-sectional area of the thermal path, $m^2$. (1 $m^2$)
- L=the layer-to-layer distance through the skeletal cage where the heat travels (0.0125 m)

Therefore, Q Transferred:
Q=$\Delta t * k * A / L$=(194° C.)*0.31 W/m·K*1 $m^2$/0.0125 m
Q=4,811 $W/m^2$ (or 0.48 $W/cm^2$).

The thermal gate designed into the MLMI between the two innermost sheet layers limits the throughput thermal conductivity to <0.5 W/mK via conduction. This backs the thermal energy into the exterior surface using the exterior surface as a heat rejecting surface.

Figure 4A:
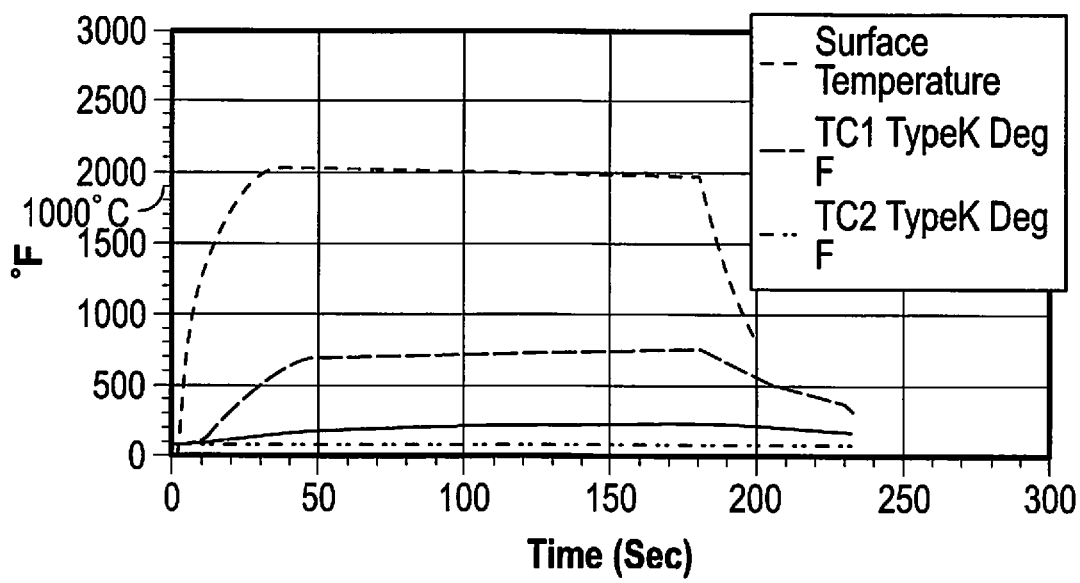
FIGS. 4A and 4B are graphs of MLMI layer temperatures versus time during tests of MLMI samples wherein a laser beam impinges on the exterior surface with respective intensities of 50 W/cm$^2$ and 200 W/cm$^2$.
Figure 4B:
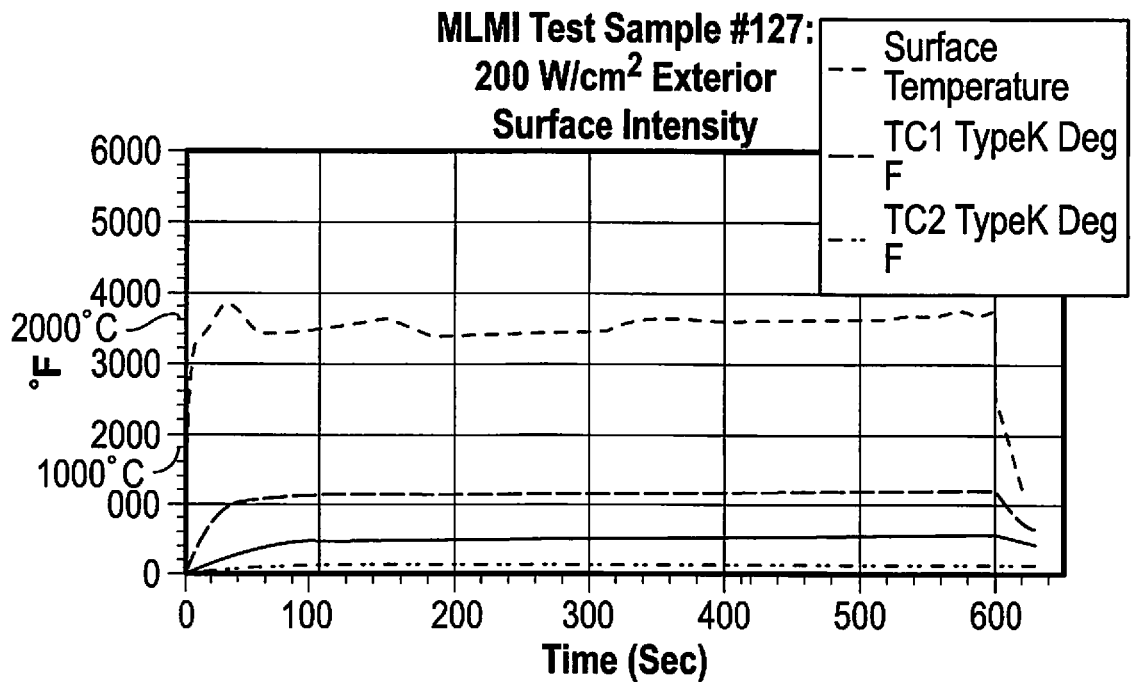

With reference to FIGS. 4A and 4B, the thermal protection aspect of the structure can be seen from two tests where the external thermal environment is simulated using laser light impinging upon the outermost surface. With a 50 $W/cm^2$ beam the external temperature is heated to about 1000° C. (1832° F.). Mainly radiant heat transfer yields maximum temperatures of 425° C. (797° F.) at the second sheet layer. (Depending upon the skeletal cage dimensions, it could be as much as 500° C. or 932° F.). At the third layer, the peak temperature is about 125° C. (257° F.), while the innermost layer is kept to only 50° C. (122° F.). (Depending upon the skeletal cage dimensions, the third level could be as much as 250° C. or 482° F., leaving the innermost interlayer to perform much of the thermal isolation.) With a 200 $W/cm^2$ laser beam impinging upon the outermost surface, the external temperature is heated to about 3500° F. (1927° C.). The mainly radiant heat transfer between the two outermost sheet layers yields a maximum temperature of 1200° F. (649° C.). At the third layer, the peak temperature is about 500° F. (260° C.), while the innermost layer is kept to only 150° F. (66° C.). Again, depending upon the skeletal cage dimensions of the various interlayers, and the sheet thickness of the next-to-innermost sheet layer, the second and third sheet layer temperatures could be higher (e.g., 900° C. and 360° C.) as the innermost interlayer performs much of the thermal gating to transfer the heat outward towards the outermost layers.

The invention claimed is:

1. An integrated multi-layer metal insulation structure for thermally isolating an interior system from external environments more than 1200° C., comprising:
   three or more refractory metal sheet layers separated from one another by respective crate standoffs, wherein refractory metal is defined to comprise any elemental or alloy metal with a melting point in excess of 1600° C., each crate standoff in the form of a skeletal cage framework of refractory metal interlayer ribs between the sheet layers and with open space pockets within cells between the ribs, each crate standoff limiting thermal transfer from one sheet layer to the next to less than 2.5 W/mK including the cells restricting internal air flow to eliminate convective heat transfer and the skeletal cage framework providing load carrying while also limiting conduction pathways and increasing conductive path length that lowers conductive heat transfer to less than 5% of environmental exposure.

2. The structure as in claim 1, wherein the cells of the skeletal cage framework are partially open cells.

3. The structure as in claim 1, wherein refractory metal sheet layers and refractory metal interlayer ribs are composed of any of niobium, titanium, hafnium, tungsten, and alloys thereof.

4. The structure as in claim 3, wherein two outermost metal sheet layers and two outermost interlayer ribs are composed of a niobium alloy material and two innermost metal sheet layers and the innermost interlayer ribs are composed of a titanium alloy.

5. The structure as in claim 1, wherein the skeletal cage framework of refractory metal interlayer ribs has a structural material coverage of between 1% and 5% of total interlayer volume, remaining 95% to 99% of the volume occupied by the cells between the ribs and by cutouts in the ribs themselves.

6. The structure as in claim 5, wherein the structure material coverage of the skeletal cage framework decreases from outermost interlayer to innermost interlayer in the multi-layer structure.

7. The structure as in claim 5, wherein the structure material coverage of the skeletal cage framework is between 1% and 2% of total interlayer volume for the innermost interlayer.

8. The structure as in claim 1, wherein refractory metal interlayer ribs in the skeletal cage framework for successive interlayers are offset from one another to provide a tortuous conductive thermal path from layer to layer.

9. The structure as in claim 1, wherein the interlayer ribs have cutouts therein.

10. An integrated multi-layer metal insulation structure for thermally isolating an interior system from external environments more than 1200° C., comprising:

three or more refractory metal sheet layers separated from one another by respective crate standoffs, wherein refractory metal is defined to comprise any elemental or alloy metal with a melting point in excess of 1600° C., each crate standoff in the form of a skeletal cage framework of refractory metal interlayer ribs between the sheet layers and with open space pockets within cells between the ribs, the ribs having cutouts therein such that the cells between the ribs are partially open cells, refractory metal interlayer ribs in the skeletal cage framework for successive interlayers are offset from one another to provide a tortuous conductive thermal path from layer to layer, each crate standoff limiting thermal transfer from one sheet layer to the next to less than 2.5 W/mK including the cells restricting internal air flow to eliminate convective heat transfer and the skeletal cage framework providing load carrying while also limiting conduction pathways and increasing conductive path length that lowers conductive heat transfer to less than 5% of environmental exposure, wherein the innermost interlayer provides a greater degree of conductive thermal isolation than the more outer interlayers.

11. The structure as in claim 10, wherein the skeletal cage framework of refractory metal interlayer ribs has a structural material coverage of between 1% and 5% of total interlayer volume, remaining 95% to 99% of the volume occupied by the cells between the ribs and by cutouts in the ribs themselves.

12. The structure as in claim 11, wherein the structure material coverage of the skeletal cage framework decreases from outermost interlayer to innermost interlayer in the multi-layer structure.

13. The structure as in claim 11, wherein the structure material coverage of the skeletal cage framework is between 1% and 2% of total interlayer volume for the innermost interlayer.

* * * * *